US010799050B1

(12) United States Patent
Glaser

(10) Patent No.: US 10,799,050 B1
(45) Date of Patent: Oct. 13, 2020

(54) DEVICE AND METHOD FOR STORING AND RETRIEVING MAILBOX PACKAGES

(71) Applicant: Todd M. Glaser, Miami Beach, FL (US)

(72) Inventor: Todd M. Glaser, Miami Beach, FL (US)

(*) Notice: Subject to any disclaimer, the term of this patent is extended or adjusted under 35 U.S.C. 154(b) by 0 days.

(21) Appl. No.: 16/654,476

(22) Filed: Oct. 16, 2019

(51) Int. Cl.
*A47G 29/12* (2006.01)
*A47G 29/20* (2006.01)
*B65G 11/02* (2006.01)

(52) U.S. Cl.
CPC ....... *A47G 29/12095* (2017.08); *A47G 29/20* (2013.01); *B65G 11/023* (2013.01); *B65G 2201/0285* (2013.01)

(58) Field of Classification Search
CPC ............. A47G 29/20; A47G 29/12095; A47G 29/124; A47G 29/16; A47G 29/1207; A47G 2029/148; B65G 11/023; B65G 65/03; B65G 2201/0285
USPC ............................ 232/45, 30–32, 43.2; 193/8
See application file for complete search history.

(56) References Cited

U.S. PATENT DOCUMENTS

| 237,315 | A | * | 2/1881 | Paul | A47G 29/1207 232/31 |
| 378,955 | A | * | 3/1888 | Dubey | A47G 29/1207 232/30 |
| 1,027,524 | A | * | 5/1912 | Cook | A47G 29/1207 232/30 |
| 1,451,343 | A | * | 4/1923 | Panagopolous | A47G 29/1207 232/30 |
| 1,506,646 | A | * | 8/1924 | Kolstad | A47G 29/124 232/19 |
| 2,421,221 | A | * | 5/1947 | Rothe | B07C 7/04 232/30 |
| 4,363,438 | A | * | 12/1982 | Connor | A47G 29/1207 232/30 |
| 4,785,960 | A | * | 11/1988 | Belisle | B65D 33/28 220/23.83 |
| 4,844,332 | A | * | 7/1989 | Long | A47G 29/1209 232/17 |
| 4,848,650 | A | * | 7/1989 | Roberts, II | A47G 29/1209 232/17 |
| 5,137,212 | A | * | 8/1992 | Fiterman | B65F 1/10 109/46 |
| 6,742,703 | B2 | * | 6/2004 | Esakov | A47G 29/1207 232/30 |
| 7,040,529 | B2 | * | 5/2006 | Swider | A47G 29/1207 232/30 |

(Continued)

*Primary Examiner* — William L Miller
(74) *Attorney, Agent, or Firm* — Trueba & Suarez PLLC; William R. Trueba, Jr.; Roberto M. Suarez

(57) ABSTRACT

A mailbox portal device, the device including a front, top, bottom, left side, right side, at least one chute in the front of the mailbox portal, where the chute opens, the at least one chute is removably connected to a pliable bag located within the mailbox portal device, a clasp connected to the pliable bag, where the clasp is in an open position to receive at least one package and the clasp is closed when disengaging the pliable bag from the mailbox portal. A method for storing and carrying packages, including opening a chute of a mailbox portal, depositing at least one package into the chute, where each package travels down the chute and into a pliable bag, disengaging the pliable bag from the mailbox portal, and closing the pliable bag for transport.

8 Claims, 5 Drawing Sheets

(56) References Cited

U.S. PATENT DOCUMENTS

| | | | | |
|---|---|---|---|---|
| 7,175,068 B2* | 2/2007 | Fitzgibbons | ....... | A47G 29/1207 232/30 |
| 7,234,633 B2* | 6/2007 | Day | ................ | A47G 29/1207 232/30 |
| 7,252,220 B1* | 8/2007 | Shreve | ............... | A47G 29/1216 232/29 |
| 7,350,690 B2* | 4/2008 | Fitzgibbons | ....... | A47G 29/1207 232/30 |
| 8,523,050 B1* | 9/2013 | Andreozzi | ........... | A47G 29/141 220/908.1 |
| 2003/0222132 A1* | 12/2003 | Esakov | .............. | A47G 29/1207 232/30 |
| 2003/0222133 A1* | 12/2003 | Esakov | .............. | A47G 29/1207 232/45 |
| 2003/0226884 A1* | 12/2003 | Swider | ............... | A47G 29/1207 232/26 |
| 2005/0006450 A1* | 1/2005 | Fitzgibbons | ....... | A47G 29/1207 232/30 |
| 2009/0014509 A1* | 1/2009 | Miller | ................ | A47G 29/1201 232/31 |
| 2012/0031960 A1* | 2/2012 | Skouboe | ................ | A47G 29/16 232/47 |
| 2017/0295980 A1* | 10/2017 | Willcox | ................ | A47G 29/141 |
| 2018/0352987 A1* | 12/2018 | Kutas | ................ | A47G 29/1214 |

* cited by examiner

DEVICE AND METHOD FOR STORING AND RETRIEVING MAILBOX PACKAGES

CROSS-REFERENCE TO RELATED APPLICATIONS

N/A

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

The invention relates to a mailbox device for depositing packages and a method for storing and carrying packages received in the mail.

Description of the Related Art

Delivering mail to the public has been a staple of society for many years. Often letters are mailed to family or friends with personal messages, or commercial marketing materials or statements are mailed to customers. A majority of these mailings are thin, envelope sized pieces that fit in a standard U.S. mailbox. The United States Postal Service (USPS) provides guidance that a standard mailbox in the United States should measure between 18 and 9/16 to 22 and 13/16 long, 6 and 1/4 to 11 inches wide, and 6 to 15 inches in height.

In today's society, consumers are increasingly ordering products through the Internet and having them delivered to their homes or places of work. The emergence of Amazon-.com is just one of many examples of such online product purchasing. However, a majority of these packages do not fit in a standard mailbox. In addition, oftentimes multiple packages are delivered and will not fit in a mailbox.

As a result, mail carriers or delivery persons routinely leave packages on doorsteps. These packages are often left outside, in plain view of the public, for hours and hours until they arrive at their home. Unfortunately, thieves target these unguarded packages sitting on doorsteps as a good opportunity to take the package for themselves. Even though the thief cannot see what is inside the box, the thief will take the package as there is little risk of police finding them.

Such theft has become so prevalent that the thieves are often referred to as "porch pirates". This is especially troublesome during the holiday season when package deliveries are at their highest levels. Even with doorbell cameras, it is still difficult to identify the thief as they approach to steal packages on the doorstep.

While certain mailboxes have been created to store such packages by a mailbox, there is no easy way to carry multiple packages from the mailbox into the home.

Accordingly, a need exists for a device that will allow a resident of a home (or office location) to store multiple packages safely, and transport the packages in one trip inside their home (or their office location).

BRIEF SUMMARY OF THE INVENTION

An object of the invention is to provide a mailbox portal, the device including a front, top, left side, right side, at least one chute in the front of the mailbox portal, wherein the chute opens, the at least one chute is removably connected to a pliable bag located within the mailbox portal device, a clasp connected to the pliable bag, wherein the clasp is in an open position to receive at least one package and the clasp is closed when disengaging the pliable bag from the mailbox portal.

With the foregoing and other objects in view there is provided, in accordance with the invention, a method for storing and carrying packages, including depositing at least one package into a pliable bag of a mailbox portal, removing the pliable bag with at least one package from the mailbox portal, and closing the pliable bag to secure the at least one package for transport.

In accordance with the objects of the invention, a method for storing and carrying packages, including opening a chute of a mailbox portal, depositing at least one package into the chute, wherein each package travels down the chute and into a pliable bag, disengaging the pliable bag from the mailbox portal, and closing the pliable bag for transport.

Although the invention is illustrated and described herein as embodied in a device for storing packages, the invention should not be limited to the details shown in those embodiments because various modifications and structural changes may be made without departing from the spirit of the invention.

The construction and method of operation of the invention and additional objects and advantages of the invention is best understood from the following description of specific embodiments when read in connection with the accompanying drawings.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. It should be appreciated that the term "package" is synonymous with terms such as "Amazon box", "mail", "mail package", "mail", "shipment", "box", "parcel", etc., and such terms may be used interchangeably as appearing in the specification and claims. Although any methods, devices or materials similar or equivalent to those described herein can be used in the practice or testing of the invention, the preferred methods, devices, and materials are now described.

Figure 1:
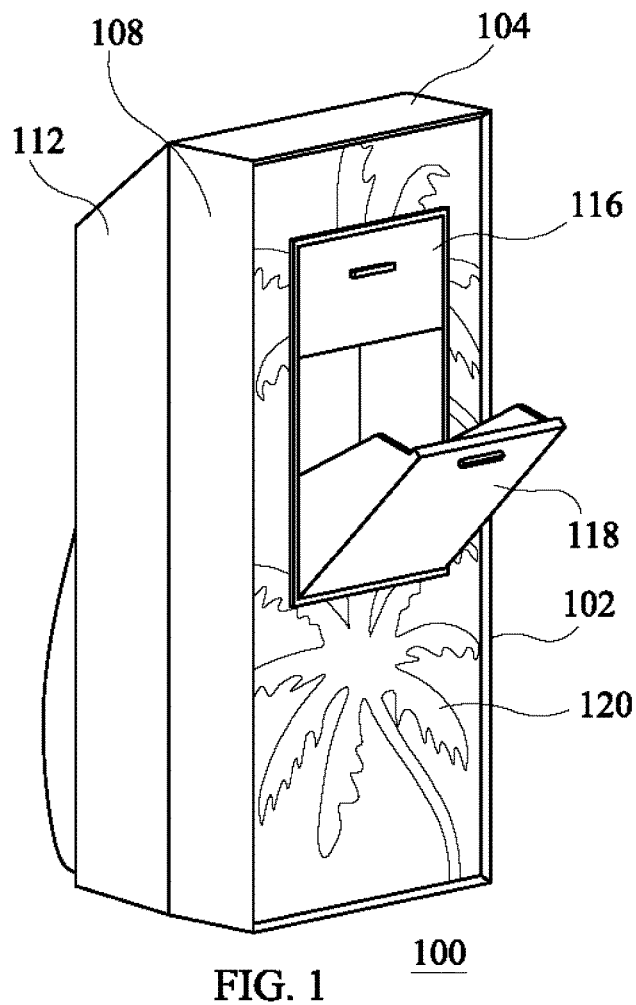
FIG. 1 is a front perspective view of a mailbox portal with a chute in an open position.
Figure 2:
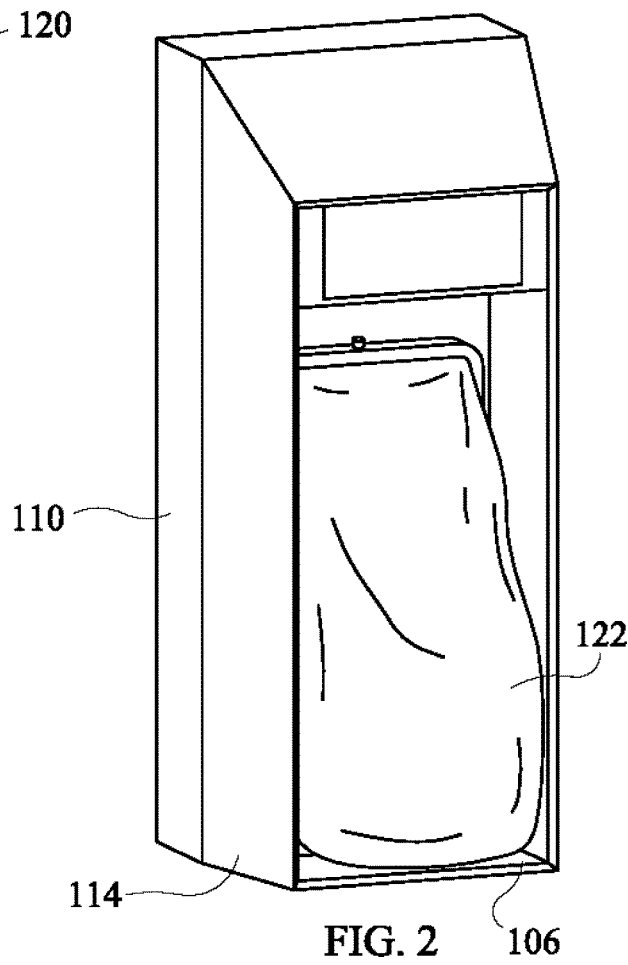
FIG. 2 a rear perspective view of the device shown in FIG. 1, showing the pliable bag with the back cover of the mailbox portal removed.

FIGS. 1 and 2 shows a mailbox portal 100 used to deposit packages and other delivery items at a person's personal residence or commercial building. The mailbox portal 100 includes a front 102, top 104, bottom 106, left side 108, and right side 110. This structure provides the structure to enclose the packages and other delivered items that are stored within the mailbox portal 100.

In an exemplary embodiment, the sides of the mailbox portal 100 taper inward. For example, a specific depth of top 104 and sides 108, 110 from the front 102 (e.g. one foot), left tapered side 112, right tapered side 114, and top tapered side 115 taper inward. The taper allows the mailbox portal 100 to fit into specific spaces, such as in commercial buildings, that have tight tolerancing dimensions for neighboring structures.

In yet another exemplary embodiment, the mailbox portal 100 includes a back cover (not pictured) to fully encapsulate the inside chamber of the mailbox portal. In some circumstances, a back cover will not be required, such as in a commercial setting with direct access to the recipients office address. However, in other circumstances, such as residential settings, a back cover is included to connect the sides, top, and bottom of the mailbox portal 100. The back cover also optionally includes a lock or other mechanism to provide authorized access to the contents of the mailbox portal 100.

Figure 3:
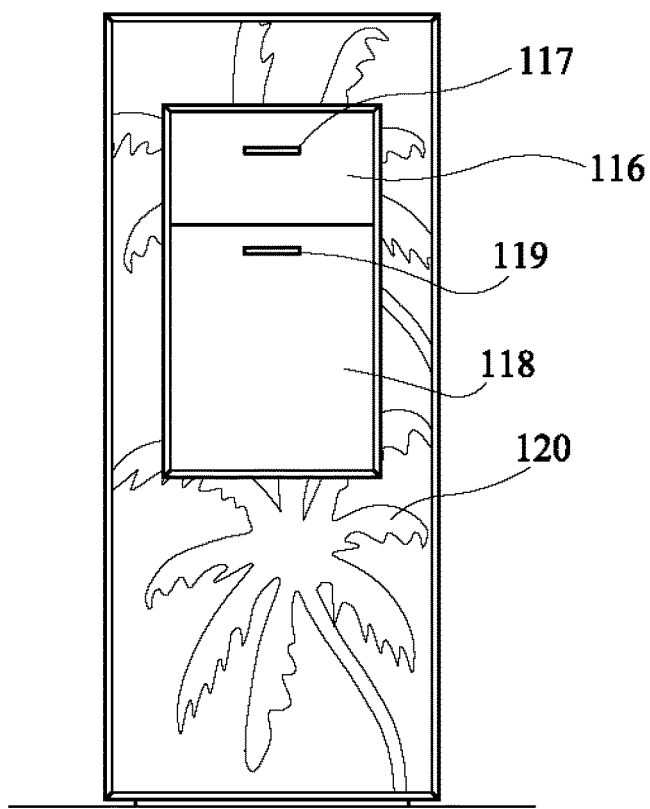
FIG. 3 is a front view of the device shown in FIG. 1, showing a decorative pattern on the border surrounding the mail chute and drawer.
Figure 5:
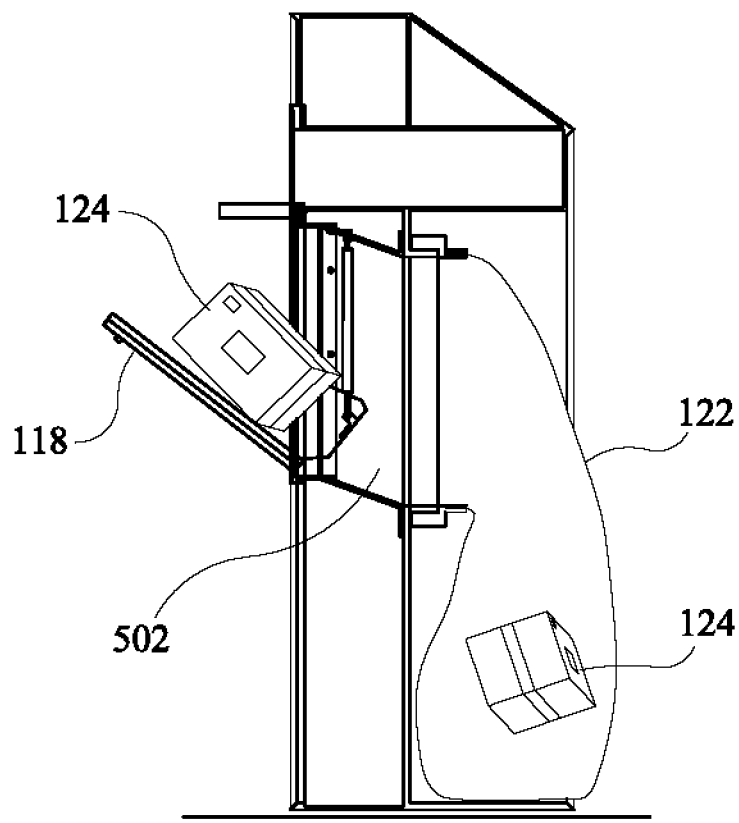
FIG. 5 is a side view of the device shown in FIG. 1, showing the chute in an open position and packages being inserted into the chute and pliable bag.

FIGS. 1, 3 and 5 show the openings on the front 102 of the mailbox portal 100. Door 116 with door handle 117 leads to a first opening on the mailbox portal 100. Door 116 includes a hinge or other picting mechanism where the bottom of the door 116 connects to front 102. When a user opens door 116 using door handle 117, the door 116 opens downward to allows the user to deposit a package within the enclosed space exposed after opening door 116.

In an exemplary embodiment, door 116 is a slidable drawer instead of a pivoting door. When the user pulls door handle 117, the door 116 pull outward horizontal, as opposed to pivoting, thereby providing a space in the drawer for the user to deposit packages.

The term user, as used herein, means any person or machine that deposits a package or item into the mailbox portal 100. While the user is frequently a USPS mail carrier, other users include, but are not limited to: FEDEX, UPS, AMAZON, couriers, and other private individuals depositing packages. In addition, a user may be a drone or other automated mechanical device capable of delivering packages and opening doors or chutes to deposit the packages. The term mailman refers to a person who delivers packages, while the term resident refers to the person who receives packages.

The mailbox portal 100 also includes chute 118 and chute handle 119. Chute 118 is the primary location to deposit multiple packages into the mailbox portal 100. A user opens cute 118 using chute handle 119. Cute 118 pivots or rotates outward from the front 102 of the mailbox portal 100. Chute 118 is larger than door 116 and includes chute sides to guide the package(s) during insertion into the mailbox portal 100.

In an exemplary embodiment, shown in FIGS. 1 and 3, front 102 includes a decorative design 120. Decorative design 120 may include palm trees, as depicted, or a wide array or other images that are either designed to enhance the appearance of the mailbox portal 100, such as artistic designs, or to camouflage the mailbox portal 100 with neighboring foliage or structures.

Figure 4:
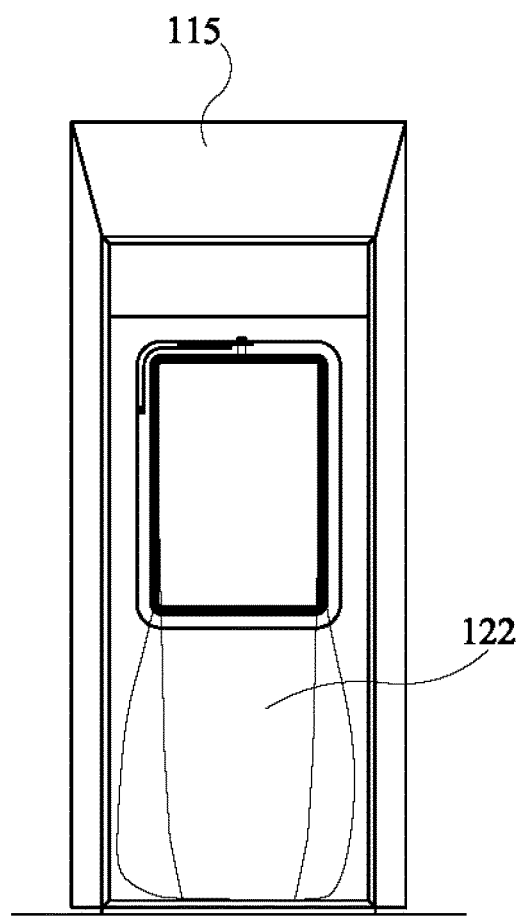
FIG. 4 is a rear view of the device shown in FIG. 1.

As shown in FIGS. 2, 4, and 5, once a user deposits a package 124 into chute 118, the package slides into pliable bag 122. As shown in FIG. 5, pliable bag 118 connects to the structure defined by inner corridor 502. The packages slides through inner corridor 502, which is connected to pliable bag 118 than is in an open position. The connection between inner corridor 502 and the pliable bag 118 is removable or detachable.

Once the pliable bag 118 is full or the user elects to retrieve the packages, the pliable bag 118 is detached from cute 118 and/or the inner corridor 502 of the mailbox portal 100. While the inner corridor 502 is preferred to provide space for the package(s) 124 to travel from the chute 118 into the pliable bag 122, the pliable bag may be directly connected to the chute 118.

Figure 6:
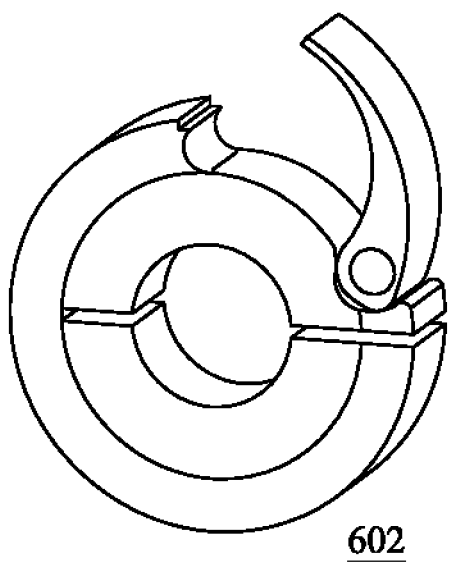
FIG. 6 is a front perspective view of a clasp used to secure the pliable bag.

FIG. 6 shows an exemplary clasp 602 used to secure the pliable bag 122 to the mailbox carrier 100. The clasp 602 is disengaged and engaged using a lever. When the user removes the pliable bag 122 from the mailbox portal 100, clasp 602 is re-engaged to secure the packages 124 within the pliable bag 122 during transport by the user. As shown in FIG. 5, the inner corridor 502 extends to the back chamber of the mailbox portal 100. The pliable bag 122 rests on the outside of the male protrusion that extend from the inner corridor 502. Once the pliable bag 122 is positioned on the male protrusions, clasp 602 is positioned over the pliable bag 122, and on top of the mail protrusions. Once positioned as described, the clasp 602 is closed to secure the pliable bag 122 onto the male protrusions of the inner corridor 502, or of the male extrusions of the cute 118 if there is no inner corridor 502.

Clasp 602 is pictured in FIG. 6 with a circular profile. In exemplary embodiments, clasp 602 is rectangular, oval, square, or contour in shape. FIG. 2 shows the back chamber with the pliable bag 122 and a rectangular clasp 602 with rounded corners used to secure the pliable bag 122 to the male protrusions of the inner corridor 502. The clasp 602 varies in dimensions to fit small, medium, and large openings for the pliable bag 122, depending on the needs of the user and location. In an exemplary embodiment, clasp 602 is locked with a pad lock, key lock, numbered combination lock, or biometric lock.

Figure 7:
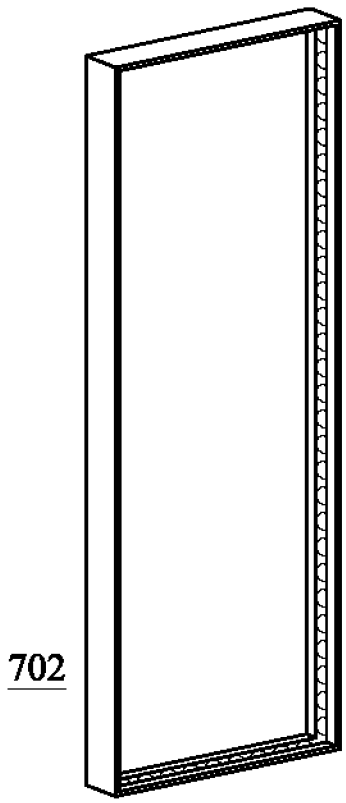
FIG. 7 is a rear perspective view of the back cover that fits into the device shown in FIG. 1.

In an exemplary embodiment, FIG. 7 depicts a light box 702 that is used on the front of the mailbox portal to provide a light source. Under dark conditions (e.g. at night or during a rain storm), the light box 702 illuminates the mailbox portal 100, which will assist users depositing packages 124.

Figure 8:
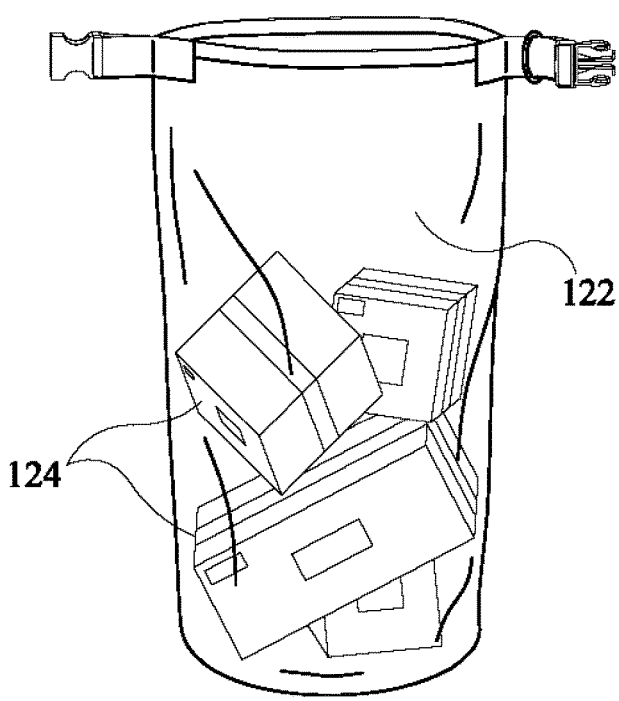
FIG. 8 is a front perspective view of the pliable bag in an open position, with packages within the pliable bag.
Figure 9:
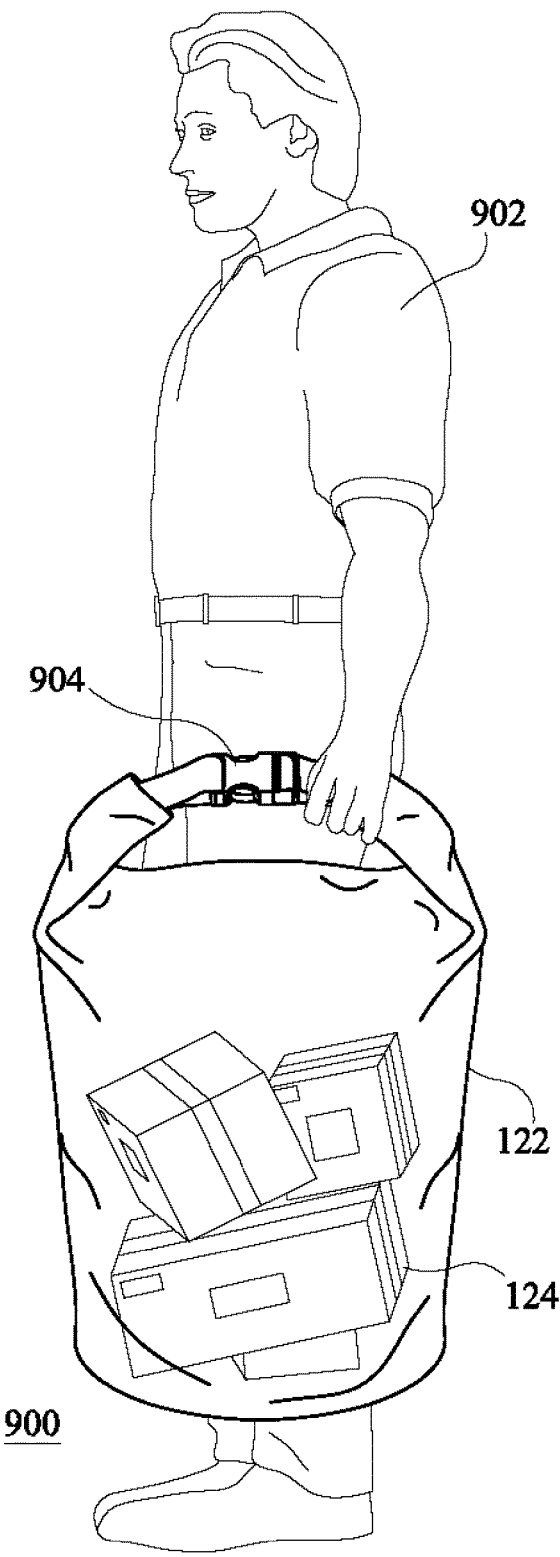
FIG. 9 is side view of a person holding the closed pliable bag.

FIG. 8 depicts an exemplary embodiment of the pliable bag 122, detached from the mailbox portal 100, using a side release buckle 904 in an open position. Once the user is ready to transport the pliable bag 122, with or without packages 124, the user 902 engages the buckle 904. As shown in FIG. 9, carrying position 902, the closed buckle 904 can be used as a handle for the user 902 to transport.

Although the clasp 602 and buckle 904 are shown as connection mechanisms, other connections mechanisms include, but are not limited to, hoop and loop, drawstring, and snap and loop.

Figure 10:
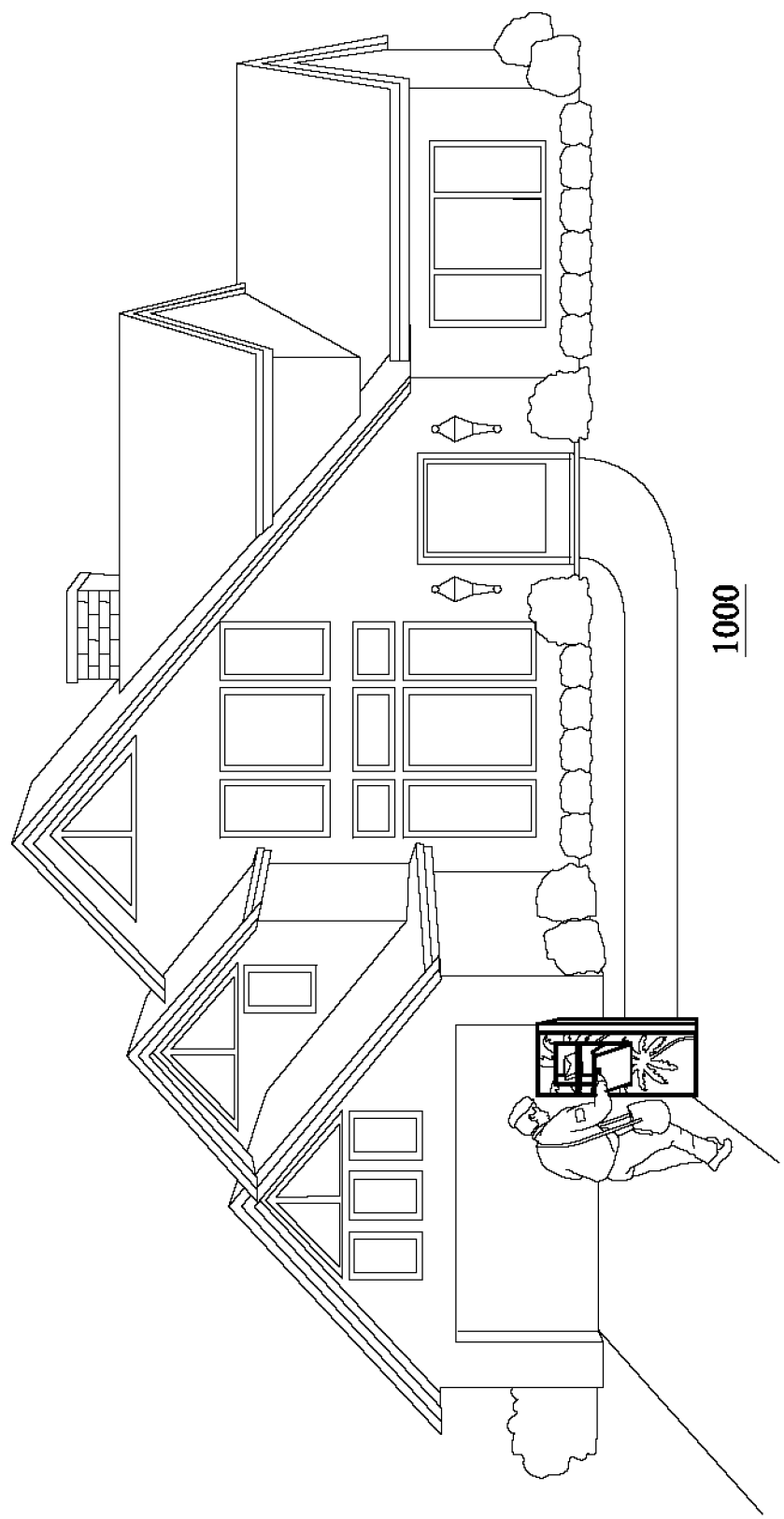
FIG. 10 is front perspective view of a mail carrier placing a package within the chute of the mailbox portal connected to a house.

FIG. 10 depicts a residential house with a mailbox portal 100 stationed in from the house. A mailmail (user 902) is opening chute handle 119 of the chute 118 to deposit a package 124 into the pliable bag 122. Later, when the resident of the house returns home, she will disconnect the pliable bag 122 from the mailbox portal 100 and empty the packages 124 within the pliable bag 124 inside the house. The mailbox portal 100 provides a secure space for users to deposit and store packages 124 until the recipient arrives to pick up the packages 124, without the fear of "porch bandits" wandering by the house and stealing the packages 124 left unguarded by the front door.

In yet another embodiment, the mailbox portal provides a method for storing and carrying packages 124. A mailman opens the chute 118 (rotates the chute 118 outward) to deposit a package 124, which passes through an inner corridor 502, and into the pliable bag 124 of a mailbox portal. Once the mailman deposits the package 124 into the chute 118, the chute rotates into a closed position, i.e. the chute's 118 initial state. Once the resident approaches the mailbox portal 100, she removes the pliable bag 122 that contains the packages 124 and closes the pliable bag (with the clasp 602, buckle 904, or other mechanism) to make the pliable bag 122 safe for transport. When the pliable bag 122 is closed, the packages 124 are secured and not likely to fall out of the pliable bag 122 during transport to a secure location, such as the resident's home.

In an exemplary embodiment of the invention, the mailman opens the chute 118 of a mailbox portal 100 and deposits or inserts a package 124 into the chute 118. Each package 124 travels down the chute 118 and into a pliable bag 122. The resident disengages the pliable bag 122 from the mailbox portal 100 and closes the pliable bag for transport.

When the resident retrieves the pliable bag 122, she optionally opens a locked back cover of the mailbox portal 100. The back cover may remain unlocked in secure environments. The user then removes the pliable bag 122 from the mailbox portal 100 and deposits the pliable bag 122 into a dwelling, such as a house. Once inside the house, the resident removes each package 124 from the pliable bag 122. Once emptied, the resident re-engages the empty pliable bag 122 to the mailbox portal 100 and closes the back cover of the mailbox portal 100 and locks the back cover, if necessary. The back cover is secured to the mailbox portal 100 using lock and key, a keypad coded combination lock, or a biometric lock (e.g. fingerprint, retina scan.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

The invention claimed is:

1. An apparatus for securely receiving, temporarily storing, and retrieving of packages, the apparatus comprising:
 a portal structure having at least a front, top, bottom, left side, and right side defining an inside chamber of the portal structure, the inside chamber further divided into a back chamber and a front chamber;
 at least one chute having a proximal entrance disposed on the front and a distal exit disposed in the back chamber;
 a one or more male protrusion disposed at the distal exit of the at least one chute and extending into the back chamber;
 a pliable bag for each of the at least one chute, the pliable bag having a bag opening wherein the pliable bag is insertedly mated around the one or more male protrusion and configured to surround the distal exit of the at least one chute; and
 a one or more clasp configured to removably secure the pliable bag onto each of the one or more male protrusion.

2. The apparatus according to claim 1, wherein the at least one chute pivots outward from the front.

3. The apparatus according to claim 1, wherein the at least one chute slides outward from the front.

4. The apparatus according to claim 1, further comprising two of the at least one chute, defined as a first chute and a second chute, wherein the first chute opens outward from the front and the second chute pivots outward from the front.

5. The apparatus according to claim 1, further comprising a back cover.

6. The apparatus according to claim 5, wherein the back cover is lockable.

7. The apparatus according to claim 1, wherein a portion of the front of the mailbox portal comprises a decorative design.

8. The apparatus according to claim 1, wherein the clasp further comprises a lock.

* * * * *